US010374212B2

(12) United States Patent
Wegner et al.

(10) Patent No.: US 10,374,212 B2

(45) Date of Patent: Aug. 6, 2019

(54) ELECTROLYTE FLUID METERING DEVICE FOR LITHIUM CELLS

(71) Applicant: Robert Bosch GmbH, Stuttgart (DE)

(72) Inventors: Marcus Wegner, Leonberg (DE); Matthias Mueller, Auenwald (DE); Martin Tenzer, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 1265 days.

(21) Appl. No.: 14/364,306

(22) PCT Filed: Nov. 15, 2012

(86) PCT No.: PCT/EP2012/072695

§ 371 (c)(1),
(2) Date: Jun. 11, 2014

(87) PCT Pub. No.: WO2013/087341

PCT Pub. Date: Jun. 20, 2013

(65) Prior Publication Data

US 2014/0315049 A1 Oct. 23, 2014

(30) Foreign Application Priority Data

Dec. 15, 2011 (DE) ........................ 10 2011 088 682

(51) Int. Cl.
*H01M 2/36* (2006.01)
*H01M 2/38* (2006.01)
(Continued)

(52) U.S. Cl.
CPC ........... *H01M 2/362* (2013.01); *H01M 2/364* (2013.01); *H01M 2/38* (2013.01); *H01M 10/052* (2013.01);
(Continued)

(58) Field of Classification Search
CPC .... H01M 2/362; H01M 2/364; H01M 10/052; H01M 10/0565; H01M 10/4242;
(Continued)

(56) References Cited

U.S. PATENT DOCUMENTS 6,371,996 B1 4/2002 Takayama et al.
8,047,241 B2 * 11/2011 Reschke .............. H01M 2/361 137/260
(Continued)

FOREIGN PATENT DOCUMENTS

DE 195 07 237 A1 9/1996
DE 10 2007 023 896 A1 11/2008
(Continued)

OTHER PUBLICATIONS

English translation Kumashiro, Yoshiaki JP 2000133322 A, May 2000.*
(Continued)

*Primary Examiner* — Cynthia H Kelly
*Assistant Examiner* — Rashid A Alam
(74) *Attorney, Agent, or Firm* — Maginot, Moore & Beck LLP

(57) ABSTRACT

A battery system includes at least one lithium cell with an electrolyte having at least one polymer which is configured to be impregnated with an electrolyte fluid. In order to increase the capacity, the life and the safety of the battery system, the battery system further includes at least one electrolyte fluid metering device, by which at least one component of the electrolyte fluid can be supplied to the lithium cell and/or by which electrolyte fluid can be discharged from the lithium cell.

17 Claims, 1 Drawing Sheet

(51) Int. Cl.

| | |
|---|---|
| ***H01M 10/052*** | (2010.01) |
| ***H01M 10/0565*** | (2010.01) |
| ***H01M 10/42*** | (2006.01) |

(52) U.S. Cl.
CPC ... *H01M 10/0565* (2013.01); *H01M 10/4242* (2013.01); *H01M 2220/10* (2013.01); *H01M 2220/20* (2013.01); *H01M 2220/30* (2013.01); *Y02E 60/122* (2013.01); *Y02T 10/7011* (2013.01)

(58) Field of Classification Search
CPC .......... H01M 2220/10; H01M 2220/30; Y02E 60/122; Y02T 10/7011
USPC ............................................................ 429/50
See application file for complete search history.

(56) References Cited

U.S. PATENT DOCUMENTS

| | | | | |
|---|---|---|---|---|
| 2002/0178575 A1* | 12/2002 | Kurosaki | H01H 3/142 29/622 | |
| 2003/0008201 A1 | 1/2003 | Komori et al. | | |
| 2005/0001628 A1* | 1/2005 | Jones | B66F 9/24 324/432 | |
| 2007/0074489 A1 | 4/2007 | Erhardt et al. | | |
| 2008/0241672 A1* | 10/2008 | Utsumi | H01M 2/0267 429/163 | |
| 2011/0171503 A1* | 7/2011 | Giroud | H01M 2/0207 429/50 | |
| 2011/0256429 A1* | 10/2011 | Schumann | H01M 2/362 429/50 | |
| 2011/0287305 A1* | 11/2011 | Scordilis-Kelley | H01M 2/1653 429/163 | |

FOREIGN PATENT DOCUMENTS

| | | | | |
|---|---|---|---|---|
| DE | 10 2009 041 070 A1 | | 7/2010 | |
| DE | 10 2009 047 057 A1 | | 5/2011 | |
| DE | 10 2010 048 320 A1 | | 5/2011 | |
| EP | 1 804 316 A2 | | 7/2007 | |
| JP | 04169056 A | * | 6/1992 | |
| JP | 2000133322 A | * | 5/2000 | |
| JP | 2000-285967 A | | 10/2000 | |
| JP | 2000-311661 A | | 11/2000 | |
| JP | 2003-17142 A | | 1/2003 | |
| JP | 2003-36892 A | | 2/2003 | |
| JP | 2003-86173 A | | 3/2003 | |
| JP | 2003-123736 A | | 4/2003 | |
| JP | 2003123736 A | * | 4/2003 | |
| JP | 2003-217566 A | | 7/2003 | |
| WO | WO-9215120 A1 | * | 9/1992 | H01M 2/40 |
| WO | 2008/141865 A1 | | 11/2008 | |

OTHER PUBLICATIONS

English translation of Koda, JP 04169056 A, Jun. 1992, Japan.*
English translation of Sasaki, JP 2003123736 A, Apr. 2003, Japan.*
International Search Report corresponding to PCT Application No. PCT/EP2012/072695, dated Mar. 18, 2013 (German and English language document) (8 pages).

* cited by examiner

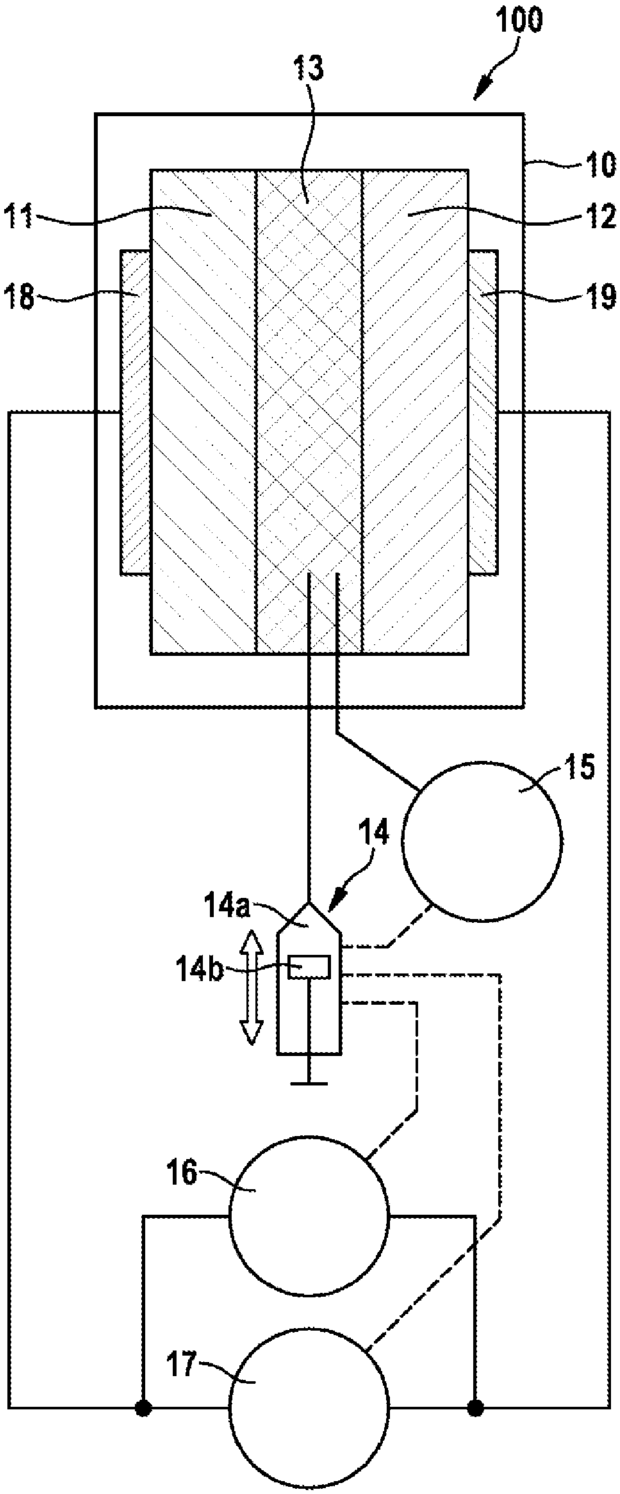
100
13
10
11
12
18
19
15
14
14a
14b
16
17

ELECTROLYTE FLUID METERING DEVICE FOR LITHIUM CELLS

This application is a 35 U.S.C. § 371 National Stage Application of PCT/EP2012/072695, filed on Nov. 15, 2012, which claims the benefit of priority to Serial No. DE 10 2011 088 682.6, filed on Dec. 15, 2011 in Germany, the disclosures of which are incorporated herein by reference in their entirety.

The present disclosure relates to a battery system, an electrolyte fluid metering device, a lithium cell, a method and a mobile or stationary system.

BACKGROUND

In the case of conventional lithium(-ion) batteries, a mixture of organic solvents and inorganic conductive salts is used as the electrolyte fluid.

A further development of this are lithium(-ion) batteries that have solid polymer electrolytes.

Combinations of these two electrolyte concepts that have gel-like electrolytes which consist of a polymer impregnated with an electrolyte fluid are also known.

SUMMARY

The subject matter of the present disclosure is a battery system, comprising

- at least one lithium cell with an electrolyte, in particular what is known as a gel-like electrolyte or gel (polymer) electrolyte, which comprises at least one polymer that is impregnated or can be impregnated with an electrolyte fluid, in particular what is known as a polymer electrolyte, and
- at least one electrolyte fluid metering device, wherein at least one component of the electrolyte fluid can be supplied to the lithium cell and/or can be discharged from the lithium cell by the electrolyte fluid metering device.

A lithium cell may be understood in particular as meaning a galvanic cell which comprises lithium as the electrochemically active cell component. A lithium cell may be understood as meaning both a lithium cell, which comprises metallic lithium or a lithium alloy as the anode material, and what is known as a lithium-ion cell, which comprises an intercalation material as the anode material, for example graphite, in which lithium ions can be reversibly inserted and extracted again, which is also respectively referred to as intercalation and deintercalation.

The components of an electrolyte fluid may be understood in particular as meaning electrolyte solvents, conductive salts and mixtures, in particular solutions, thereof. For example, an electrolyte fluid may comprise one or more, in particular organic, electrolyte solvents, for example selected from the group of carbonates and ethers, and one or more conductive salts, for example $LiPF_6$.

The electrolyte fluid metering device may in this case be designed both for the metering of the (entire) electrolyte fluid, that is to say a mixture of one or more electrolyte solvents and one or more conductive salts, and for the (separate) metering of one or more electrolyte solvents and/or of one or more conductive salts.

The electrolyte fluid metering device advantageously makes it possible for additional electrolyte components, for example in the form of electrolyte fluid or electrolyte solvent and/or conductive salt, to be supplied to the lithium cell or for electrolyte components, for example in the form of electrolyte fluid, to be removed from the lithium cell, and thereby makes it possible to adjust or set the electrolyte fluid in the polymer at any time in such a way that the lithium cell can be optimally set for the respective application and the operating state at the time. Thus, in turn, a high capacity can be advantageously achieved in a wide variety of applications. Moreover, a high level of safety can also be achieved in this way. The fact that the electrolyte fluid, for example the amount of electrolyte fluid, can always be adapted or reduced to the requirements at the time makes it possible moreover for parasitic secondary reactions, which could otherwise use up the electrolyte fluid and even in the long term destroy the lithium cell, to be significantly reduced, and thereby the lifetime of the lithium cell to be significantly prolonged. Furthermore, an aging-induced and possibly temperature-related degeneration of the electrolyte fluid in the lithium cell can be advantageously compensated, for example by electrolyte fluid being replenished by the electrolyte fluid metering device, and in this way the effects of aging significantly reduced, and consequently the lifetime likewise significantly prolonged.

The electrolyte fluid has advantageous effects on the ion conductivity of the electrolyte. The polymeric component of the electrolyte may advantageously have a high temperature resistance.

Within the scope of one embodiment, the amount of the at least one electrolyte fluid component, in particular the electrolyte fluid, in the lithium cell can be regulated, in particular automatically, by the electrolyte fluid metering device. For example, it may be that the amount of electrolyte solvent and/or the amount of conductive salt and/or the amount of electrolyte solvent in the lithium cell can be regulated, in particular automatically, by the electrolyte fluid metering device.

Within the scope of a further embodiment, the lithium cell comprises an anode, a cathode and a separator arranged in between. In this case it is possible that the separator comprises the electrolyte or is formed from it. In particular, one or more interfaces for supplying and/or discharging the at least one electrolyte fluid component, for example electrolyte fluid, in particular by or from/in the electrolyte fluid metering device, may be formed in the region of the separator, in particular at one or more locations at the periphery of the separator.

The electrolyte fluid metering device may in particular be connected or connectable to the lithium cell by one or more fluid lines.

Within the scope of a further embodiment, the electrolyte fluid metering device has at least one electrolyte fluid component reservoir, the volume of which can be varied by a movable wall. In a way similar to in the case of a syringe, the movable wall may for example be a movable, in particular displaceable, wall of a relatively rigid material. However, it is similarly possible to form the movable wall from an elastic material and to bring about the change in volume by a change in the stretching of the elastic material. For example, the electrolyte fluid metering device may also have two or more electrolyte fluid component reservoirs, in particular of such a kind, of which for example one electrolyte fluid component reservoir may be designed for storing electrolyte fluid and/or one electrolyte fluid component reservoir may be designed for storing electrolyte solvent and/or one electrolyte fluid component reservoir may be designed for storing conductive salt.

Within the scope of a further embodiment, the electrolyte fluid metering device has at least one interface for filling the electrolyte fluid component reservoir with at least one electrolyte fluid component, for example electrolyte fluid and/or electrolyte solvent and/or conductive salt, and/or for removing at least one electrolyte fluid component, for example electrolyte fluid and/or electrolyte solvent and/or conductive salt, from the electrolyte fluid component reservoir. In this way, the electrolyte fluid component reservoir can be provided with new electrolyte fluid and/or new electrolyte solvent and/or new conductive salt. Moreover, the electrolyte fluid metering device may thus also be used, for example in the course of a servicing of the lithium cell or of the battery system, for exchanging the electrolyte fluid in the lithium cell completely or for replacing it with new electrolyte fluid. Thus, the capacity, the lifetime and the safety of the lithium cell, and consequently of the battery system, can be advantageously increased.

Within the scope of a further embodiment, the battery system comprises at least one measuring device. In particular, this may be at least one measuring device that is selected from the group comprising (cell) voltage measuring devices, (cell) current measuring devices, (internal cell) resistance measuring devices, (internal cell) temperature measuring devices or a combination thereof.

The measuring device(s) may be integrated in the electrolyte fluid metering device or be a component of the electrolyte fluid metering device. However, it is similarly possible that the measuring device(s) are measuring devices of the battery system, for example of a battery management system, that are also used for other purposes.

Within the scope of a further embodiment, the battery system comprises a control device. The control device may be designed in particular for controlling the electrolyte fluid metering device in dependence on at least one measuring parameter, in particular selected from the group comprising the cell voltage, cell current, internal cell resistance, temperature and combinations thereof.

The control device may in this case be integrated in the electrolyte fluid metering device or be a component of the electrolyte fluid metering device. However, it is similarly possible that the control device is a control device of the battery system, for example of a battery management system, that is also used for other purposes.

In order to receive measuring parameters from one or more measuring devices, the control device may have at least one interface for the signaling connection of a measuring device. For example, the control device may have an interface for the signaling connection of a (cell) voltage measuring device and/or an interface for the signaling connection of a (cell) current measuring device and/or an interface for the signaling connection of a(n) (internal cell) resistance measuring device and/or an interface for the signaling connection of a(n) (internal cell) temperature measuring device.

Within the scope of a further embodiment, the control device activates the electrolyte fluid metering device to supply electrolyte fluid to the lithium cell if the internal cell resistance, in particular at the temperature at the time, is higher than a predetermined, in particular upper, limit value.

Within the scope of a further embodiment, the control device activates the electrolyte fluid metering device to discharge electrolyte fluid from the lithium cell if the internal cell resistance, in particular at the temperature at the time, is lower than a predetermined, in particular lower, limit value.

Within the scope of a further embodiment, the control device does not activate the electrolyte fluid metering device to supply or discharge electrolyte fluid to or from the lithium cell if the internal cell resistance, in particular at the temperature at the time, corresponds to the predetermined limit value or lies within a range that extends from the lower limit value to the upper limit value.

If a single limit value, for example x, is set for the internal cell resistance, electrolyte fluid may for example be supplied when there is an internal cell resistance greater than x or electrolyte may for example be discharged when there is an internal cell resistance less than x, or no supply and discharge of electrolyte fluid take place when there is an internal cell resistance equal to x.

However, it is similarly possible to provide a range of tolerance. This may take place for example by setting an upper limit value, for example $x_o$, and a lower limit value, for example $x_u$. Then, electrolyte fluid may for example be supplied when there is an internal cell resistance greater than $x_u$ or electrolyte may for example be discharged when there is an internal cell resistance less than $x_u$ or no electrolyte fluid supply and discharge may take place when there is an internal cell resistance that is greater than or equal to $x_u$ and less than or equal to $x_o$.

Within the scope of a further embodiment, the amount of electrolyte fluid to be supplied or to be discharged is proportional to the difference between the internal cell resistance and a or the corresponding limit value.

Within the scope of a further embodiment, the position or stretching of the movable wall of the electrolyte fluid metering device is variable in proportion to the difference between the internal cell resistance and a or the corresponding limit value.

The battery system may comprise both one lithium cell and two or more lithium cells. If the battery system comprises multiple lithium cells, the battery system may comprise both one electrolyte fluid metering device, which is designed for example for supplying electrolyte fluid to all of the lithium cells, and multiple electrolyte fluid metering devices, which are designed for example for supplying electrolyte fluid respectively to one of the lithium cells. If the battery system comprises an electrolyte fluid metering device which is designed for supplying electrolyte fluid to multiple lithium cells, the electrolyte fluid metering device may comprise a controllable valve, in particular an automatically controllable valve, in particular for each lithium cell to be supplied with electrolyte fluid. In particular, in this case a controllable valve, in particular an automatically controllable valve, may be integrated in each section of fluid line that enters the lithium cell. It can in this way be advantageously brought about that the amount of electrolyte fluid in one or more specific lithium cells can be regulated, while the amount of electrolyte fluid in other lithium cells, which for example already contain an optimum amount of electrolyte fluid, can be retained.

With regard to further features and advantages of the battery system according to the disclosure, reference is hereby made explicitly to the explanations in connection with the electrolyte fluid metering device according to the disclosure explained later, the lithium cell according to the disclosure explained later, the method according to the disclosure explained later, the mobile or stationary system according to the disclosure explained later and also to the FIGURE and the description of the FIGURE.

A further subject matter of the present disclosure is an electrolyte fluid metering device for a lithium cell or a battery system, in particular for a battery system according to the disclosure or a lithium cell according to the disclosure explained later and/or for carrying out a method according to the disclosure explained later.

In particular, the electrolyte fluid metering device may comprise an electrolyte fluid component reservoir. The electrolyte fluid component reservoir may in particular have a movable wall for varying the volume of the electrolyte fluid component reservoir. In a way similar to in the case of a syringe, the movable wall may for example be a movable, in particular displaceable, wall of a relatively rigid material. However, it is similarly possible to form the movable wall from an elastic material and to bring about the change in volume by a change in the stretching of the elastic material.

Furthermore, the electrolyte fluid metering device may comprise at least one measuring device and/or at least one interface for the signaling connection of at least one measuring device. In particular, this may be at least one measuring device that is selected from the group comprising (cell) voltage measuring devices, (cell) current measuring devices, (internal cell) resistance measuring devices, (internal cell) temperature measuring devices or a combination thereof.

Furthermore, the electrolyte fluid metering device may comprise a control device and/or at least one interface for the signaling connection of a control device. The control device may in particular be designed for controlling the electrolyte fluid metering device in dependence on at least one measuring parameter, in particular selected from the group comprising the cell voltage, cell current, internal cell resistance, temperature and combinations thereof.

In order to receive measuring parameters from one or more measuring devices, the control device may have at least one interface for the signaling connection of a measuring device. For example, the control device may have an interface for the signaling connection of a (cell) voltage measuring device and/or an interface for the signaling connection of a (cell) current measuring device and/or an interface for the signaling connection of a(n) (internal cell) resistance measuring device and/or an interface for the signaling connection of a(n) (internal cell) temperature measuring device.

The control device may activate the electrolyte fluid metering device to supply electrolyte fluid to the lithium cell in particular if the internal cell resistance, in particular at the temperature at the time, is higher than a predetermined, in particular upper, limit value and/or to discharge electrolyte fluid from the lithium cell if the internal cell resistance, in particular at the temperature at the time, is lower than a predetermined, in particular lower, limit value.

If the internal cell resistance, in particular at the temperature at the time, corresponds to the predetermined limit value or lies within a range that extends from the lower limit value to the upper limit value, the control device may make the electrolyte fluid metering device neither supply nor discharge electrolyte fluid to or from the lithium cell.

The amount of electrolyte fluid to be supplied or discharged may be proportional to the difference between the internal cell resistance and a or the corresponding limit value.

The position or stretching of the movable wall of the electrolyte fluid metering device may in particular be variable in proportion to the difference between the internal cell resistance and a or the corresponding limit value.

The electrolyte fluid metering device may be designed both for supplying electrolyte fluid to one lithium cell and to multiple lithium cells. If the electrolyte fluid metering device is designed for supplying electrolyte fluid to multiple lithium cells, the electrolyte fluid metering device may comprise a controllable valve, in particular an automatically controllable valve, in particular for each lithium cell to be supplied with electrolyte fluid. In particular, in this case a controllable valve, in particular an automatically controllable valve, may be integrated in each section of fluid line that enters the lithium cell. It can in this way be advantageously brought about that the amount of electrolyte fluid in one or more specific lithium cells can be regulated, while the amount of electrolyte fluid in other lithium cells, which for example already contain an optimum amount of electrolyte fluid, can be retained.

Within the scope of one embodiment, the electrolyte fluid metering device has at least one interface for filling the electrolyte fluid component reservoir with at least one electrolyte fluid component, in particular electrolyte fluid, and/or for removing at least one electrolyte fluid component, in particular electrolyte fluid, from the electrolyte fluid component reservoir.

The electrolyte fluid metering device may thus also be used, for example in the course of a servicing of the lithium cell, or of the battery system, for exchanging the electrolyte fluid in the lithium cell completely or for replacing it with new electrolyte fluid. Thus, the capacity, the lifetime and the safety of the lithium cell, and consequently of the battery system, can be advantageously increased.

With regard to further features and advantages of the electrolyte fluid metering device according to the disclosure, reference is hereby made explicitly to the explanations in connection with the battery system according to the disclosure, the lithium cell according to the disclosure explained later, the method according to the disclosure explained later, the mobile or stationary system according to the disclosure explained later and also to the FIGURE and the description of the FIGURE.

A further subject matter of the present disclosure is a lithium cell, for example for use in a battery system according to the disclosure and/or with an electrolyte fluid metering device according to the invention disclosure and/or for carrying out a method according to the disclosure explained later, which has an anode, a cathode, a separator arranged in between and an electrolyte, the electrolyte comprising at least one polymer that is impregnated or can be impregnated with an electrolyte fluid. In this case it is possible that the separator comprises the electrolyte or is formed from it. In particular, one or more interfaces for supplying and/or discharging at least one electrolyte fluid component, in particular electrolyte fluid, in particular by the electrolyte fluid metering device, may be formed in the region of the separator, in particular at one or more locations at the periphery of the separator.

With regard to further features and advantages of the lithium cell according to the disclosure, reference is hereby made explicitly to the explanations in connection with the battery system according to the disclosure, the electrolyte fluid metering device according to the disclosure, the method according to the disclosure explained later, the mobile or stationary system according to the disclosure explained later and also to the FIGURE and the description of the FIGURE.

A further subject matter of the present disclosure is a method for operating a battery system, for example a battery system according to the disclosure, and/or a lithium cell, for example a lithium cell according to the disclosure and/or an electrolyte fluid metering device, for example an electrolyte fluid metering device according to the disclosure, which comprises the following method steps:

a) ascertaining the internal cell resistance of a lithium cell and possibly the temperature of the lithium cell,
b) determining whether the internal cell resistance ascertained, in particular at the temperature ascertained, lies above a predetermined, in particular upper, limit value or below a predetermined, in particular lower, limit value, and c) supplying electrolyte fluid to the lithium cell if the internal cell resistance ascertained is higher than the predetermined, in particular upper, limit value, or removing electrolyte fluid from the lithium cell if the internal cell resistance ascertained is lower than the predetermined, in particular lower, limit value.

The method according to the disclosure advantageously allows the amount of electrolyte fluid of a lithium cell with a gel-like electrolyte to be set variably and in a self-regulating or automatically regulated manner, whereby the advantages as explained above can be achieved.

For example, it can be directly deduced from the measured cell voltage and the current or from an internal resistance of the cell that can be calculated therefrom and the temperature at the time inside the cell whether the amount of electrolyte fluid located in the cell is sufficient (measured resistance corresponds to setpoint value), has to be increased (measured resistance is higher than setpoint value) or has to be reduced (measured resistance is lower than setpoint value).

The increase in the amount of electrolyte fluid may then take place by supplying metered fluid by way of the electrolyte fluid metering device. The reduction may take place analogously by way of a removal of electrolyte fluid from the cell by the same electrolyte fluid metering device. The way in which the electrolyte fluid metering device functions may in this case resemble a syringe.

The supplying or discharging of electrolyte fluid may take place at one or more locations at the periphery of the separator, for example specific points, since the amount of electrolyte fluid spreads out by itself in the separator or the solid electrolyte polymer. The calculation of the supply or discharge of the electrolyte fluid, and consequently the conversion of the measured current, voltage and temperature values into a corresponding displacement of the movable wall of the electrolyte fluid metering device, may be undertaken either by a suitable electronic control device directly on or in the electrolyte fluid metering device or else by a control device that is present, for example a battery management system that is present.

With regard to further features and advantages of the method according to the disclosure, reference is hereby made explicitly to the explanations in connection with the battery system according to the disclosure, the electrolyte fluid metering device according to the disclosure, the lithium cell according to the disclosure, the mobile or stationary system according to the disclosure explained later and also to the FIGURE and the description of the FIGURE.

A further subject matter of the present disclosure is a mobile or stationary system, which comprises a battery system according to the disclosure and/or an electrolyte fluid metering device according to the disclosure and/or a lithium cell according to the disclosure and/or which carries out a method according to the disclosure. In particular, it may be a vehicle, for example a hybrid, plug-in hybrid or electric vehicle, an energy storage system, for example for stationary energy storage, for example in a house or a technical installation, a power tool, an electric garden tool or an electronic device, for example a notebook, a PDA or a cell phone.

An account of the particularly high safety requirements in automotive applications, the battery system according to the disclosure, the electrolyte fluid metering device according to the disclosure, the lithium cell according to the disclosure and/or the method according to the disclosure are especially suitable for hybrid, plug-in hybrid and electric vehicles.

With regard to further features and advantages of the mobile or stationary system according to the disclosure, reference is hereby made explicitly to the explanations in connection with the battery system according to the disclosure, the electrolyte fluid metering device according to the disclosure, the lithium cell according to the disclosure, the method according to the disclosure and also to the FIGURE and the description of the FIGURE.

BRIEF DESCRIPTION OF THE DRAWINGS

Further advantages and advantageous refinements of the subjects according to the disclosure are illustrated by the drawing and explained in the description that follows. It should be noted that the drawing is only of a descriptive character and is not intended to restrict the disclosure in any form. In the drawing:

The FIGURE shows a schematic representation of an embodiment of a battery system according to the disclosure, an electrolyte fluid metering device according to the disclosure and a lithium cell according to the disclosure.

DETAILED DESCRIPTION

The FIGURE shows a battery system 10, which comprises a lithium cell 100, which comprises an anode 11, a cathode 12, a separator 13 arranged in between and also a gel-like electrolyte (not represented) of a polymer impregnated with an electrolyte fluid. For the electrical contacting of the anode 11 and cathode 12, the lithium cell 100 also has an anodic current collector 18 and a cathodic current collector 19.

The FIGURE illustrates that the battery system also comprises an electrolyte fluid metering device 14, which is configured in the manner of a syringe and has an electrolyte fluid component reservoir 14*a*, the volume of which can be varied by a movable wall 14*b*.

The FIGURE illustrates that a fluid line which extends from the electrolyte fluid metering device 14 and by way of which electrolyte fluid can be supplied to or discharged from the lithium cell 100 by the electrolyte fluid metering device 14 enters the lithium cell 100 in the region of the separator 13. In this way it is advantageously possible to control, in particular automatically, the amount of electrolyte fluid in the lithium cell 100 by the electrolyte fluid metering device 14.

The FIGURE shows that the battery system also comprises an internal cell temperature measuring device 15, a cell voltage measuring device 16 and a cell current measuring device 17, which are respectively connected in signaling terms to the electrolyte fluid metering device 14. The dashed lines illustrate that the signaling connections are not necessarily formed by cables, but may also be cableless. In particular, the internal cell temperature measuring device 15, the cell voltage measuring device 16 and the cell current measuring device 17 are connected to a control device (not represented) integrated in the electrolyte fluid metering device 14.

The control device can ascertain from the cell voltage measured by the cell voltage measuring device 16 and the current measured by the cell current measuring device 17 the internal cell resistance, which suggests whether electrolyte fluid should possibly be supplied or removed. Since the internal cell resistance is temperature-dependent, the internal cell temperature measured by the internal cell temperature measuring device 15 may additionally be included, in order to determine a temperature-corrected internal cell resistance and to control a supply or removal of electrolyte fluid on the basis of this.

In dependence on the internal cell resistance, possibly while taking the internal cell temperature into account, the control device can control the electrolyte fluid metering device 14, in particular the position of the movable wall 14*b* of the electrolyte fluid component reservoir 14*a*.

The control may in this case take place in particular in such a way that, if the internal cell resistance at the temperature at the time is higher than a predetermined limit value, electrolyte fluid is supplied to the lithium cell 100 and, if the internal cell resistance ascertained at the temperature at the time is lower than the predetermined limit value, electrolyte fluid is removed from the lithium cell 100.

Since the supply and discharge of electrolyte fluid can in turn influence the measuring parameters measured later, such as the cell voltage, current and internal cell temperature, this procedure may possibly also be referred to as feedback control, and the control device referred to as a feedback control device.

It is thus advantageously possible overall for the amount of electrolyte fluid within the gel-polymer electrolyte to be automatically controlled or regulated in both directions, in particular in dependence on the current, voltage and temperature.

The invention claimed is:

1. A battery system, comprising:

at least one lithium cell with an electrolyte, the electrolyte including at least one polymer configured to be impregnated with an electrolyte fluid; and at least one electrolyte fluid metering device including a control device electrically connected to the at least one lithium cell, a reservoir fluidically connected to the at least one lithium cell and containing at least a portion of the electrolyte fluid, and a movable wall located within the reservoir, the control device configured to generate an electronic supply signal configured to cause the movable wall to move within the reservoir to supply the electrolyte fluid into the at least one lithium cell from the reservoir and to generate an electronic discharge signal configured to cause the movable wall to move within the reservoir to discharge the electrolyte fluid from the at least one lithium cell into the reservoir.

2. The battery system as claimed in claim 1, further comprising:

a sensor electrically connected to the control device and operatively connected to the at least one lithium cell, wherein the electrolyte fluid metering device is configured to regulate automatically an amount of the at least one component of the electrolyte fluid in the at least one lithium cell based on at least one of a voltage, a current, and a temperature of the at least one lithium cell as sensed by the sensor.

3. The battery system as claimed in claim 1, wherein:

the at least one lithium cell includes an anode, a cathode and a separator arranged between the anode and the cathode, and the at least one lithium cell includes at least one interface fluidically connected to the separator, the metering device configured to supply and to discharge the at least one component of the electrolyte fluid through the interface.

4. The battery system as claimed in claim 1, wherein the electrolyte fluid metering device has at least one interface fluidically connected to the separator for filling the electrolyte fluid component reservoir with at least one component of the electrolyte fluid and for removing at least one component of the electrolyte fluid from the electrolyte fluid component reservoir.

5. The battery system as claimed in claim 1, further comprising at least one measuring device.

6. The battery system as claimed in claim 1, wherein:

the control device is configured to activate the electrolyte fluid metering device to supply electrolyte fluid to the lithium cell from the reservoir when an internal cell resistance is higher than a predetermined upper limit value, the control device is configured to activate the electrolyte fluid metering device to discharge electrolyte fluid from the lithium cell to the reservoir when the internal cell resistance is lower than a predetermined lower limit value, and the control device is configured to not activate the electrolyte fluid metering device to supply or discharge electrolyte fluid to or from the lithium cell when the internal cell resistance corresponds to a predetermined limit value or lies within a range that extends from the lower limit value to the upper limit value.

7. The battery system as claimed in claim 1, wherein an amount of electrolyte fluid to be supplied or to be discharged is proportional to a difference between an internal cell resistance and a corresponding limit value.

8. An electrolyte fluid metering device for a battery system, the electrolyte fluid metering device comprising:

at least one electrolyte fluid component reservoir including a movable wall configured to vary a volume of the electrolyte fluid component reservoir;

at least one measuring device operably connected to the battery system and configured to generate a measurement signal; and a control device electrically connected to the at least one measuring device, the control device configured to cause the moveable wall to move relative to the reservoir to supply electrolyte fluid from the reservoir into the battery system based on the measurement signal and to cause the movable wall to move relative to the reservoir to discharge electrolyte fluid from the battery system into the reservoir based on the measurement signal.

9. The electrolyte fluid metering device as claimed in claim 8, further comprising at least one interface fluidically connected to the separator for filling the electrolyte fluid component reservoir with at least one electrolyte fluid component and for removing at least one electrolyte fluid component from the electrolyte fluid component reservoir.

10. A method for operating a battery system, comprising:

ascertaining an internal cell resistance of a lithium cell;

determining whether the internal cell resistance ascertained lies above a predetermined upper limit value or below a predetermined lower limit value;

supplying electrolyte fluid to the lithium cell from a reservoir fluidically coupled to the lithium cell when the internal cell resistance ascertained is higher than the predetermined upper limit value by moving a movable wall located within the reservoir in a first direction to supply electrolyte fluid from the reservoir into the lithium cell; and removing electrolyte fluid from the lithium cell when the internal cell resistance ascertained is lower than the predetermined lower limit value by moving the movable wall in a second direction to discharge electrolyte fluid from the lithium cell into the reservoir.

11. The battery system as claimed in claim 1, wherein the battery system is included in a vehicle.

12. The battery system as claimed in claim 2, wherein the electrolyte fluid metering device is configured to regulate an amount of the electrolyte fluid in the at least one lithium cell.

13. The battery system as claimed in claim 2, wherein the electrolyte fluid metering device is configured to regulate the amount of the at least one electrolyte fluid component in the at least one lithium cell automatically.

14. The battery system as claimed in claim 1, wherein a position of the movable wall of the electrolyte fluid metering device is variable in proportion to a difference between an internal cell resistance and a corresponding limit value.

15. The battery system as claimed in claim 7, wherein a position of the movable wall of the electrolyte fluid metering device is variable in proportion to the difference between the internal cell resistance and the corresponding limit value.

16. The electrolyte fluid metering device as claimed in claim 8, wherein the electrolyte fluid metering device is included in a vehicle.

17. The method as claimed in claim 10, wherein the method is carried out by a vehicle.

* * * * *